(12) United States Patent
Schmidt (10) Patent No.: US 8,491,835 B2
(45) Date of Patent: Jul. 23, 2013

(54) ARMOR SHELL AND FABRICATION METHODS

(75) Inventor: Wayde R. Schmidt, Pomfret Center, CT (US)

(73) Assignee: United Technology Corporation, Hartford, CT (US)

( * ) Notice: Subject to any disclaimer, the term of this patent is extended or adjusted under 35 U.S.C. 154(b) by 0 days.

(21) Appl. No.: 13/326,719

(22) Filed: Dec. 15, 2011

(65) Prior Publication Data

US 2012/0079700 A1 Apr. 5, 2012

Related U.S. Application Data

(60) Division of application No. 11/901,360, filed on Sep. 17, 2007, now Pat. No. 8,101,272, which is a continuation-in-part of application No. 11/567,282, filed on Dec. 6, 2006, which is a continuation-in-part of application No. 11/455,049, filed on Jun. 16, 2006.

(51) Int. Cl.
    *B28B 1/52* (2006.01)
(52) U.S. Cl.
    USPC .......................... 264/640; 264/642; 264/643
(58) Field of Classification Search
    None
    See application file for complete search history.

(56) References Cited

U.S. PATENT DOCUMENTS

| | | | |
|---|---|---|---|
| 3,409,907 A | 11/1968 | Barratt | |
| 4,097,294 A | 6/1978 | Rice et al. | |
| 4,800,065 A | 1/1989 | Christodoulou et al. | |
| 4,836,084 A | 6/1989 | Vogelesang et al. | |
| 4,857,093 A | 8/1989 | Prewo et al. | |
| 4,879,165 A | 11/1989 | Smith | |
| 4,913,953 A | 4/1990 | Prewo et al. | |
| 4,923,747 A | 5/1990 | McCullough, Jr. et al. | |
| 5,009,687 A | 4/1991 | Kromrey | |
| 5,352,529 A | 10/1994 | Scanlon et al. | |
| 5,469,773 A | 11/1995 | Tarpinian | |
| 5,542,820 A | 8/1996 | Eaton et al. | |
| 5,738,818 A | 4/1998 | Atmur et al. | |
| 5,853,653 A | 12/1998 | Donato et al. | |
| 5,970,843 A | 10/1999 | Strasser et al. | |
| 6,135,006 A | 10/2000 | Strasser et al. | |
| 6,228,437 B1 | 5/2001 | Schmidt | |
| 6,314,858 B1 | 11/2001 | Strasser et al. | |
| 6,497,966 B2 | 12/2002 | Cohen | |
| 6,641,893 B1 | 11/2003 | Suresh et al. | |
| 6,955,112 B1 | 10/2005 | Adams et al. | |
| 2002/0088340 A1 | 7/2002 | Chu et al. | |
| 2003/0151152 A1 * | 8/2003 | Nichelson et al. | 264/29.1 |

OTHER PUBLICATIONS

Imanaka, Multilayered Low Temperature Cofired Ceramics LTCC Technology, Copyright 2005, p. 63.
Sun et al., Journal of Electronic Materials, vol. 33, No. 12, 2004, pp. 1516-1523.
Oxford English Dictionary, definition of the term "hard", Copyright 2010.
Oxford English Dictionary, definition of the term "compress", Copyright 2010.

* cited by examiner

*Primary Examiner* — Mary F Theisen
(74) *Attorney, Agent, or Firm* — Carlson, Gaskey & Olds, P.C.

(57) ABSTRACT

A refractory ceramic composite for an armor shell, comprising a ceramic core that is formable to replicate a portion of a three dimensional surface, e.g., of an aircraft, to provide ballistic protection. A method of making a shell of refractory ceramic armor capable of conforming to the geometry is provided. The shell is formed by forming a mold to replicate the surface area; arranging a ceramic core on the mold; and removing the mold to leave said ceramic core, and heat treating the ceramic core to a desired hardness. The ceramic core is in the shape of the surface area.

21 Claims, 7 Drawing Sheets

ARMOR SHELL AND FABRICATION METHODS

RELATED APPLICATIONS

This application is a divisional of U.S. application Ser. No. 11/901,360 filed on Sep. 17, 2007 now U.S. Pat. No. 8,101,272, which is a continuation-in-part of U.S. application Ser. No. 11/567,282 filed on Dec. 6, 2006, which is a continuation-in-part of U.S. application Ser. No. 11/455,049, filed on Jun. 16, 2006.

BACKGROUND OF THE INVENTION

Field of the Invention

This disclosure relates to ceramic-containing armor composites for articles, supports and vehicles, including aircraft vehicles, such as helicopters, and the fabrication methods. More particularly, the disclosure relates to polymer infiltrated felts and polymer-derived ceramics used for combat vehicle armor. Still more particularly, the disclosure relates to ceramic armor composites having a hard phase combined with an energy absorbent structure and the fabrication methods. One embodiment of this disclosure contains a hard outer surface and an energy absorbent inner core.

In the combat environment there is a continuing and ongoing need to provide improved ballistic protection to various vehicles, e.g., aircraft and helicopters. During combat, helicopters are extremely vulnerable to sniper attacks. Current armor technology is capable of providing Type IIIA protection, and typically contains fiber-reinforced polymer composite, for example, glass or Kevlar® reinforced thermoplastic.

In heavily armored helicopters, components are designed to withstand 12.7 mm rounds, with vital engine and rotor components designed to be capable of withstanding 23 mm or larger fire. Enhanced armor, such as that offering Type IV protection, is often a composite structure that incorporates a thick, solid metal plate or a dense ceramic phase to produce the desired degree of hardness. Such armor is often heavy (which is undesirable for example in flight vehicles), difficult to manufacture in a cost effective manner, and limited to simple geometries such as flat structures with minimal curvature. During use, the impact force of projectiles is often inadequately distributed in such armor because the hard phases in the composite are poorly integrated with a more compliant structure or flexible backing component. Such backing components are generally fabricated with layers of organic polymer fiber-based cloth or fabrics to provide strength and toughness. In practice, armor is designed so that the hard face breaks upon impact with the incoming round, thereby damaging the round, and the compliant backing structure provides additional resistance to travel by the broken hard face or damaged round.

Ceramics presently in use for armor are of a composite nature having the ceramic hard surface and the more deformable polymer based backing. The ceramic surface is generally silicon carbide (SiC), boron carbide ($B_4C$), alumina ($Al_2O_3$), zirconia ($ZrO_2$), silicon nitride ($Si_3N_4$), spinels, aluminum nitride (AlN), tungsten carbide (WC), titanium diboride ($TiB_2$) and combinations thereof. The materials used for the backing are often fibrous and include materials such as glass, polyimide (Kevlar®) and polyethylene (Spectra®, Dyneema®).

The methods for manufacturing such composites have numerous limitations. Currently, their fabrication methods limit the armor configurations to flat plates or simple planar geometries or modestly curved shapes. Such armor is very heavy and can negatively impact maneuverability of the vehicle. The associated fabrication methods typically require high temperatures, e.g., above 1500° C., and often above 2000° C., and pressures above 2000 psi. Such fabrication requirements are costly, energy consuming, slow and not generally suitable for mass production. For example, complex and expensive tooling or die sets are generally required to form such armor structures. As a result, lightweight, highly curved armor configurations with Type IV protection derived from ceramic composites are not presently available.

Accordingly, there is a need for lightweight, highly curved ceramic composites that offer ballistic or blast protection that can be easily fabricated using a wide variety of composite architectures suitable for different combat applications.

SUMMARY OF THE INVENTION

The present disclosure provides for a ceramic based armor component having a lightweight, highly curved configuration.

The present disclosure also provides for a polymer derived ceramic based armor capable of providing ballistic protection to a combat vehicle, including to the leading edges of combat vehicles' blades.

The present disclosure further provides for a lightweight refractory ceramic composite armor that is infiltrated with polymer to create a felt reinforced structure.

The present disclosure still further provides for a lightweight polymer derived ceramic based matrix armor capable of providing ballistic protection.

A method of making a shell of refractory ceramic armor capable of conforming to a complex geometry is provided. The shell is formed by forming a mold to replicate the surface area; arranging a ceramic core on the mold; and removing the mold to leave said ceramic core. The ceramic core is in the shape of the complex surface area.

BRIEF DESCRIPTION OF THE DRAWINGS

FIG. 1b is a photograph of a fibrous ceramic felt of FIG. 1a.

DETAILED DESCRIPTION

Figure 1A:
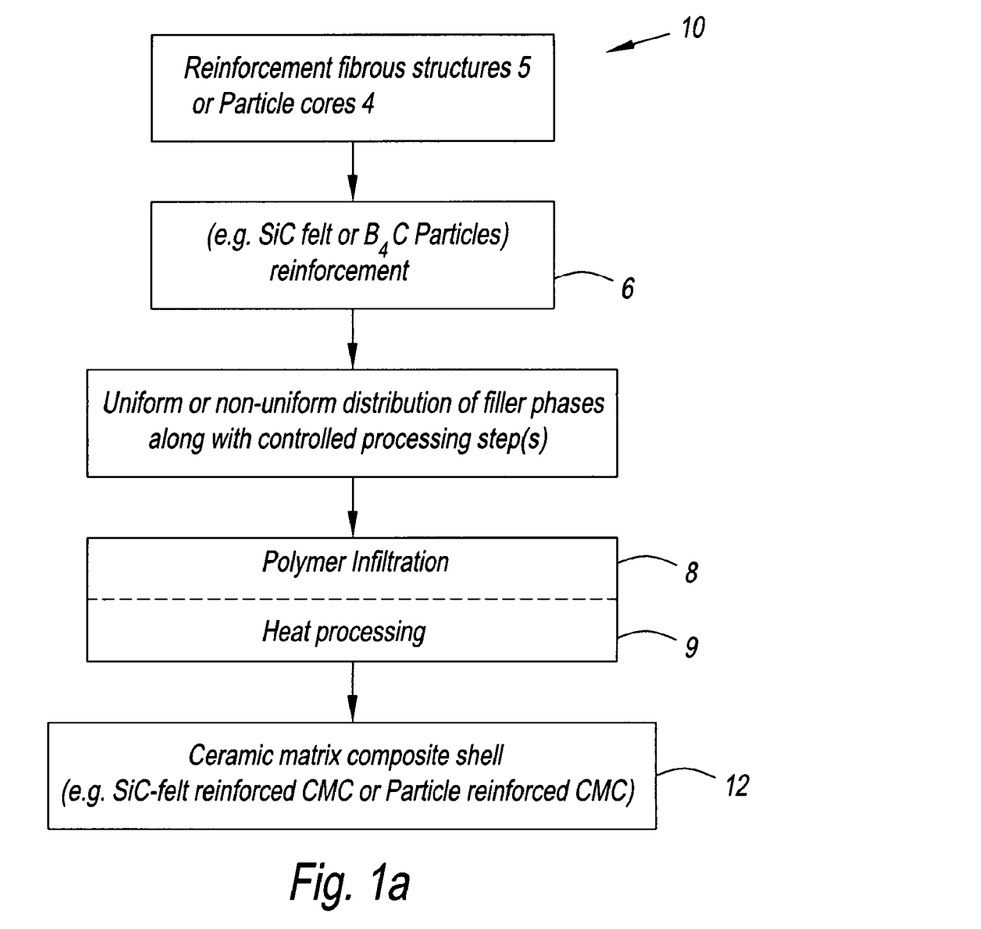
FIG. 1a illustrates a schematic diagram describing generally the method of making the refractory ceramic when structured primarily as a filler core according to the present invention.
Figure 1B:
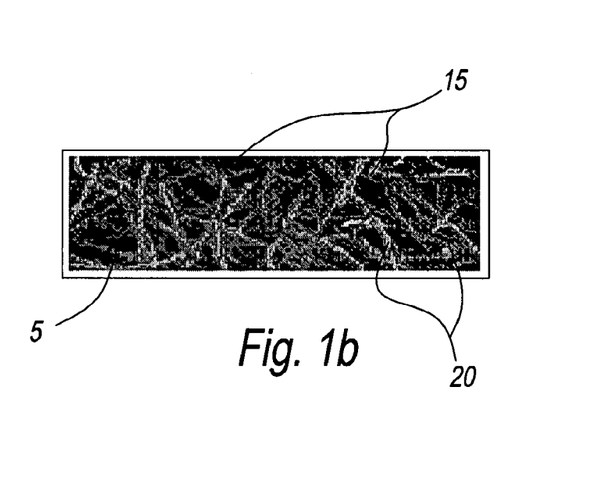

Referring to FIG. 1a, a schematic diagram describing the reinforcement structures including fibrous ceramic felts and particulate based cores, hereinafter, reinforcement cores, of the present invention is provided and generally referred to by reference numeral 10. Referring to FIG. 1b, fibrous structures 5 have voids 20 and struts 15 as a feature of its architecture. Generally fibrous structures 5 are highly porous. Voids 20 between struts 15, permit flowing of preceramic polymers (i.e. those polymers intentionally designed to convert to desired ceramic phases), or particles (ceramic, metal or polymer) dispersed in a liquid medium throughout fibrous structures 5.

Fibrous structures 5 are generally carbon based and can be formed of for example, fibers derived from carbon pitch or polyacrylonitrile resins, chopped carbon fibers, carbon nanotubes, activated carbon fibers or the like. Other felts or filler structures may be boron, aluminum, silicon or molybdenum based. The benefit of these fibrous structures 5 is that they provide an excellent substrate through, and on which, preceramic polymers can flow for subsequent processes such as heating. Further, they exhibit favorable properties at high temperatures such as relatively high strength, low density, tailorable thermal conductivity, electrical resistivity, oxidative resistance and controlled thermal expansion. In addition to felts, fibrous structures may also include carbon, boron, aluminum and silicon-based refractory ceramics 6 such as, but not limited to porous particulate combinations, single crystal whiskers, chopped fibers, and mixtures of varying degrees of porosity. Particulate matter is selected based on particle geometry, particle size, size distribution and overall ability to be located within the porous structure of the fibrous structures 5.

Fibrous structure 5 is infiltrated with a source of the desired preceramic phase(s), including carbon, in step 8. The carbon source can be any suitable carbon source such as, but not limited to pre-ceramic polymers that create carbon in addition to refractory phases such as carbides, oxycarbides, nitrides, carbonitrides, oxides, oxynitrides, borides or borocarbonitrides, phenolic precursors to glassy carbon, particulate carbon powder, and any combinations thereof, including mixtures of different pre-ceramic polymers. After infiltration, fibrous structures 5 are exposed to one or more heat processing steps 9. Heat can be delivered through any number of methods include thermal (e.g. furnace heating) or radiation (e.g. exposure to infrared or microwave radiation) processes. Such processing steps can include one or more infiltration steps 8 or pyrolysis cycles 9 required for adequate material phase development, densification and hardening. Pyrolytic conversion occurs generally between approximately 250° C. and 1100° C. Crystallization generally occurs between approximately 1150° C. to approximately 200° C., with crystal size and percent crystallinity generally increasing with exposure temperature and time. Depending upon the desired characteristics, including hardness or residual porosity, additional polymeric infiltration can take place followed by pyrolysis cycles 9. The resultant product is a ceramic matrix composite shell 12.

Figure 2:
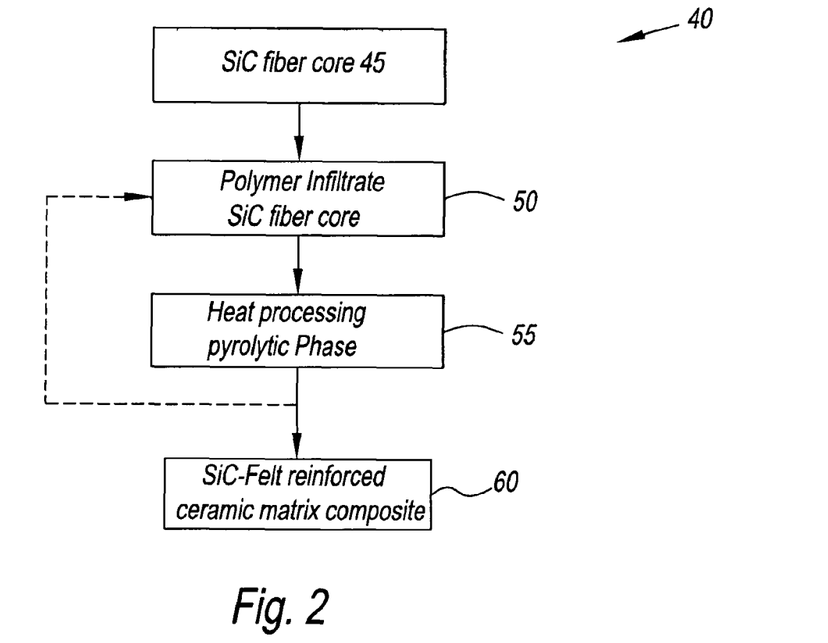
FIG. 2 is a flow chart illustrating an exemplary embodiment of a method of making the refractory ceramic of FIG. 1.

Referring to FIG. 2, a method of making a first embodiment of the fibrous structure 5 is shown and generally referred to by reference numeral 40. In this example, a silicon-containing fiber core, such as silicon carbide (SiC) 45 is infiltrated with a polymer during the infiltration step 50. Infiltration is generally accomplished by immersing the silicon-containing fiber core 45 in a liquid polymer or polymer-containing liquid chosen to provide the matrix phase of the composite. For example, an immersed SiC fiber core is heated during step 55 to temperatures ranging from to approximately 250° C. to approximately 2000° C. Step 50 and step 55 may be repeated depending on the desired properties of the end product. By altering the volume of polymer that is infiltrated during step 50, modifying the process conditions, such as temperature, of step 55, and varying the cooling times, the properties of the resultant SiC felt reinforced ceramic matrix composite 60 can be varied.

Figure 3:
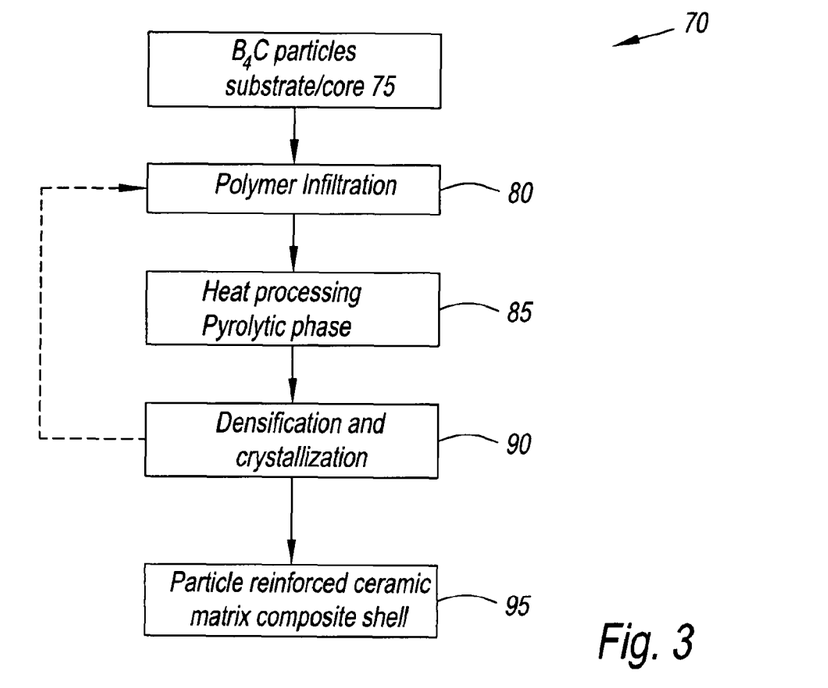
FIG. 3 is a flow chart illustrating an exemplary embodiment of a method of making a further refractory ceramic of FIG. 1.

Referring to FIG. 3, a method of making a second embodiment of the core reinforcement 10 is shown and generally referred to by reference numeral 70. In this example, a boron carbide ($B_4C$) particulate core structure 75 is used to provide reinforcement to form a ceramic matrix composite shell 95. During step 80 $B_4C$ particle core structure 75 is infiltrated with polymer. Similar to process 40, the infiltrated $B_4C$ core enters the pyrolytic phase 85 and is heated to temperatures ranging from approximately 250° C. to approximately 2000° C., depending on the type of polymer selected and the desired matrix phase(s). During step 90, the $B_4C$ core structure can be optionally cooled or treated (e.g. to enhance crystallization of the converted polymer phase) prior to a further infiltration step 80. Steps 80 through 90 may be repeated depending on the desired properties of the end product. By altering the volume of polymer that is infiltrated during step 80, the processing conditions, such as temperature profile, of step 85, or the time and temperature profile during step 90, the properties of the end product can be customized for the ballistic application.

Conventional densification of boron carbide panels to full theoretical density is commonly done by hot pressing or hot isostatic pressing and typically requires temperatures greater than approximately 2000° C., pressures above 2000 psi, and highly controlled processing techniques. The use of boron carbide particulate, in combination with polymer infiltrants that convert to ceramics below approximately 1600° C. offers several processing advantages. For example, the desired hardness of the boron carbide phase is provided by the particulate, and when preceramic polymers to either $B_4C$ or SiC are used, the voids initially between the boron carbide particles are filled with additional $B_4C$ or SiC, respectively, at relatively lower temperatures. Thus, a relatively dense structure, desirable for ballistic protection, is provided at temperatures below those required by conventional means.

Figure 4:
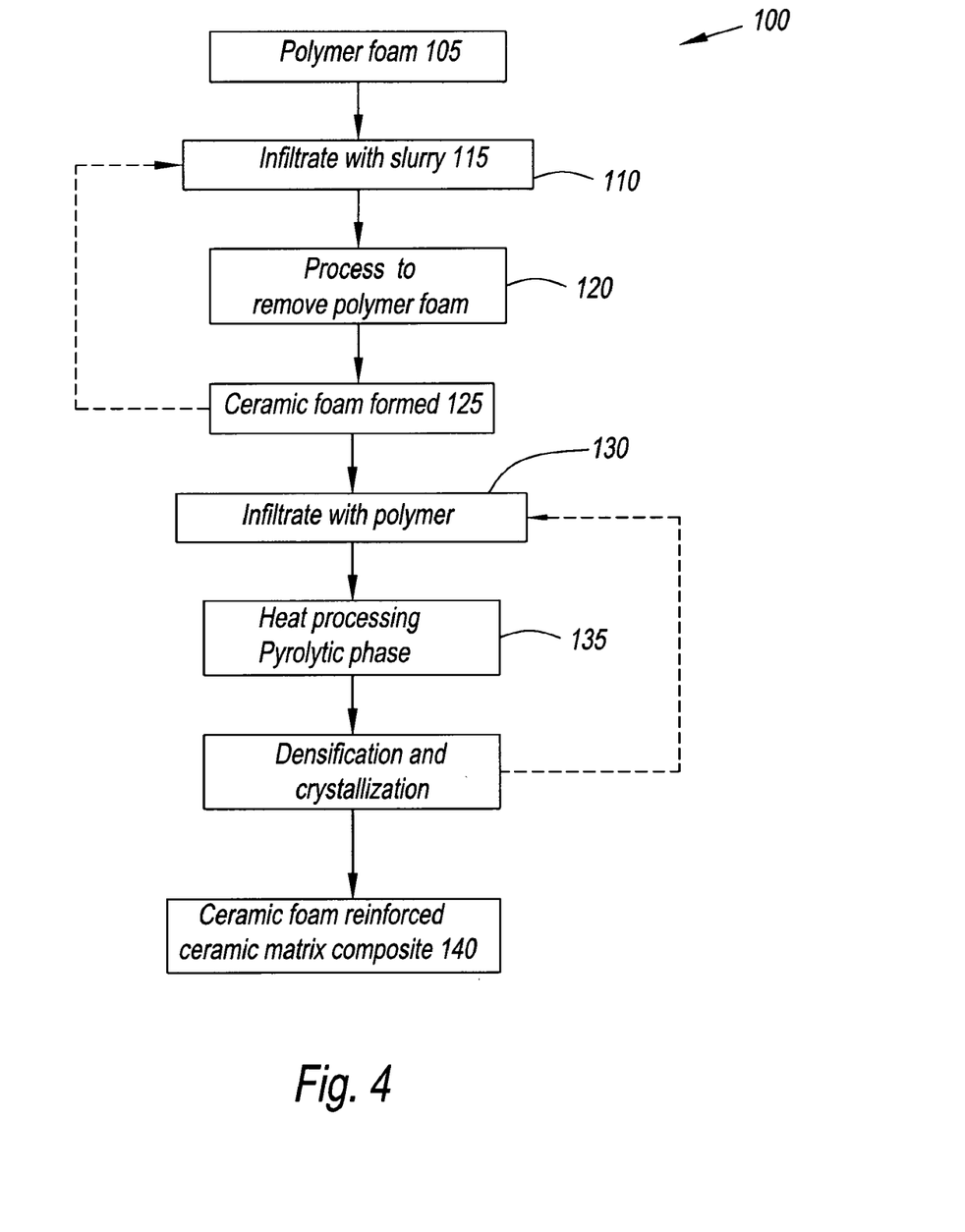
FIG. 4 is a flow chart illustrating an exemplary embodiment of a method of making a further refractory ceramic of FIG. 1.

Referring to FIG. 4, a method of making a third embodiment of reinforcement core 10 of FIG. 1 is shown, and generally referred to by reference numeral 100. In this example, a ceramic foam 125 is formed and used as the reinforcement phase to form a ceramic foam reinforced ceramic matrix composite 140. In step 110, an organic polymer foam 105 (e.g. polyurethane) is infiltrated with powder slurry 115. Powder slurry 115 is formed by mixing very fine and hard ceramic powders with water, solution, or another medium such as a mixture of preceramic polymer and particulate, or combinations thereof. Powder slurry 115 may also contain sintering or densification aids. During step 120, infiltrated polymer foam 105 is heated to burn out the organic polymer foam 105, partially dry the structure and generally increase its rigidity. Alternate means of removing the polymer foam are also contemplated, such as solvent removal. After step 120, a ceramic foam core 125 remains having a porous structure. Ceramic foam 125 is infiltrated with a preceramic polymer in step 130 and heated in step 135. During step 135, the infiltrated ceramic form core 125 is subsequently heated to temperatures ranging from approximately 250° C. to approximately 2000° C. or greater, depending on the type of polymer selected and the desired matrix phase(s). Step 135 may be repeated depending on the desired properties of the end product. By altering the volume of polymer that is infiltrated during step 130, and the time, temperature and atmosphere used in step 135, the properties of the ceramic foam reinforced ceramic matrix composite 140 can be customized for the ballistic application.

Figure 5:
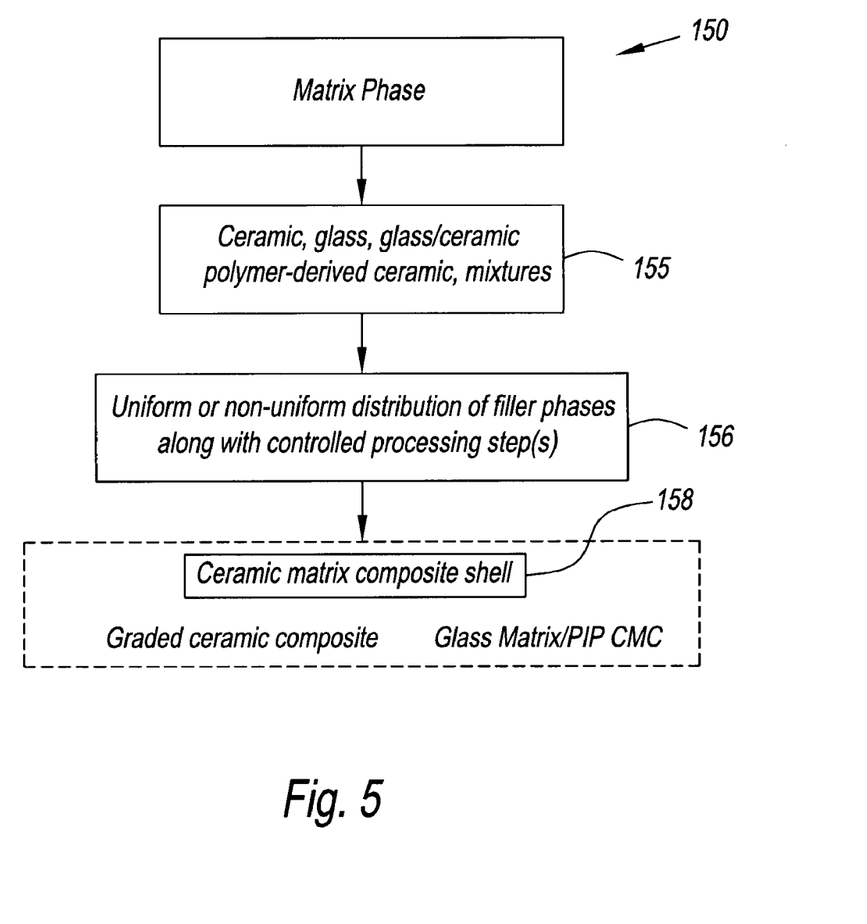
FIG. 5 illustrates a schematic diagram describing the refractory ceramic when structured primarily as a matrix, according to the present invention.

Referring to FIG. 5, a schematic diagram describing the refractory ceramic of the present invention, when structured primarily as a matrix phase, is provided and generally referred to by reference numeral 150. Refractory matrix 150 is generally not as porous as the fibrous structures of FIGS. 1 through 2. Refractory matrix 150 is, for example, a ceramic, glass, glass/ceramic mixture, polymer-derived ceramic phase(s) or combinations thereof, and may include oxides or silicon carbide or boron carbide ceramic phase(s). For example, silicon carbide and boron carbide matrix materials 155 are conveniently derived from grinding hardened preceramic polymers to produce a powder. Glass powders 155 such as silica-based glasses, including borosilicates may be selected based on their desired viscosity at a given temperature, such that they will flow into at least a portion of voids with processing and thereby increase the overall density of the structure. Mixtures prepared by combining ground, hardened powders derived from preceramic polymers with liquid forms of preceramic polymers can also be used. Generally, these preceramic polymers can be further successively hardened in step 156 and crystallized when exposed to higher temperatures and extended times, such that resultant ground powders have a very dense crystalline structure and are extremely hard. Such powders are exposed to temperatures ranging from approximately 250° C. to approximately 2000° C. or greater, depending on the type of polymer selected and the desired matrix phase(s). Proper control of the ratio of powder to liquid polymer, as well as the number, type and duration of successive heating steps, provides the ability to tailor both the amount of porosity, as well as the hardness, of the resulting structure. Such control is important to create a composite 158 with appropriate ballistic protection.

Figures 6, 7:
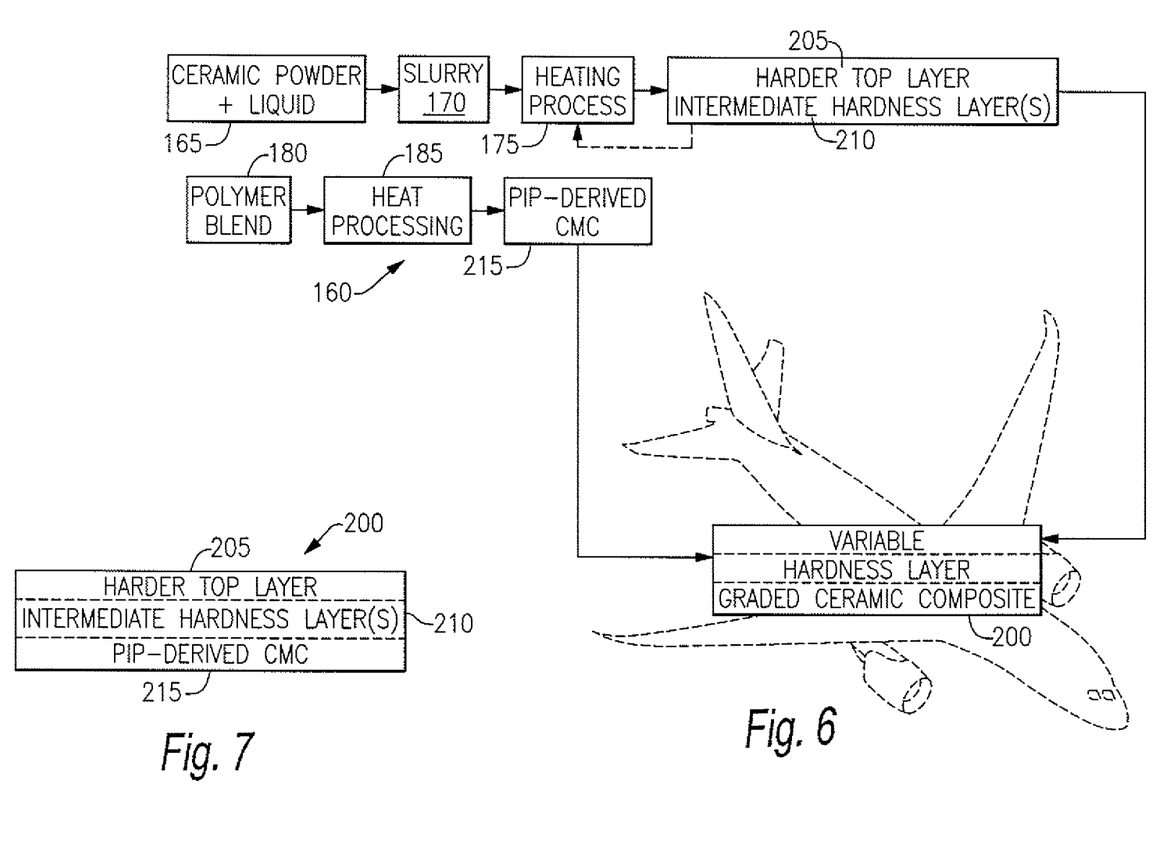
FIG. 6 is a flow chart illustrating an exemplary embodiment of a method of making the refractory ceramic of FIG. 5.
FIG. 7 illustrates a schematic representation of a graded ceramic composite of FIG. 6.

Referring to FIGS. 6 and 7, the method of making a graded ceramic composite 200 is shown, and generally referred to by reference numeral 160. Graded ceramic composite 200 is distinguished in that it provides differing degrees of hardness in a single ceramic composite. Graded ceramic composite 200 features regions of differing hardness, such as a very hard outer coating or top layer 205, an intermediate layer 210 of reduced hardness relative to the harder top layer and a somewhat softer layer 215. Layer 205 is particular suited for deflecting, damaging and defeating ballistic impacts because if its immense hardness. In contrast, layer 215 is suited to absorb some of the impact of the ballistic impact due to its relative softness, compressibility and greater toughness relative to the harder top layers. It is important that the various layers are substantially bonded to one another, that is that the topmost layer is well bonded to the intermediate layer(s) and the intermediate layer(s) are sufficiently bonded to the inner most layer(s). This bonding is important to maintain communication between the topmost layer and the innermost layers, i.e. to effectively dissipate impact energy to the layers of the graded composite.

Layers 205 and 210 are formed from a mixture of ceramic powders and a dispersive liquid 165 that form a slurry 170. The dispersive liquid can be water, a water based solution, or an organic or inorganic based liquid or solution. The dispersive liquid may also contain a preceramic polymer. Solutions can also contain various dispersion agents and surfactants as necessary. Slurry 170 is heated during a processing step 175 to form hard outer layers 205 and 210. Slurry 170 is heated to temperatures ranging from approximately 250° C. to approximately 2000° C., depending on the type of ceramic selected and the composition of the slurry components, as well as the structure and composition of the desired matrix phase(s). Hard outer or top layer 205 and intermediate hardness layers 210 are optionally reheated in step 175 and further hardened to the desired hardness to form the harder layers of the graduated composite 200. Hard outer or top layer 205 may be heated to a greater degree (higher temperatures/longer exposure) than intermediate hardness layer 210 to ensure additional hardness. Layers 205 and 210 can be alternatively formed by modifying an existing layer. For example, residual porosity in a layer 205 can be reduced by filling this porosity with desired phase(s) using a variety of methods. Specifically, voids volume can be reduced by deposition of ceramic phase from the vapor (physical or chemical vapor deposition), from electrophoretic or electrostatic deposition from an additional ceramic slurry, by infiltration with ceramic-filled polymer pastes, and combinations of these or similar methods.

Layer 215 is formed from an inorganic or organometallic polymer or polymer blend 180 that is heat processed in step 185 in a controlled atmosphere and converted into one or more ceramic phase(s) 215. Preferably the ceramic phase(s) 215 contain additional reinforcement structures such as particulate or fibrous structures 5, such that a polymer-derived ceramic matrix composite 215 results. This (Polymer Infiltration and Pyrolysis) PIP-derived CMC 215, layer 205 and layer(s) 210 are bonded to form graduated ceramic composite 200. While discrete steps to create a bonded graduated ceramic matrix composite 200 have been described, this disclosure includes the formation of a similarly graded PIP CMC which can be bonded to harder layers 205 and 210. The benefit of such a graduated ceramic composite structure is that it offers multiple functionality in a single armor component. The integral structure of the hard upper surface and energy absorbent softer sub layers allow integration of what was previously accomplished by two separate components. Accordingly, the graduated ceramic structure is stronger and lighter than a similarly sized piece of armor that was previously available. The lightness is achieved because prior armor structures were monolithic in nature and did not offer graduated hardness or density. Further, the integrated structure reduces the need for a separate flexible layer proximate the surface of the aircraft to absorb the energy of a ballistic impact.

Figures 8, 9:
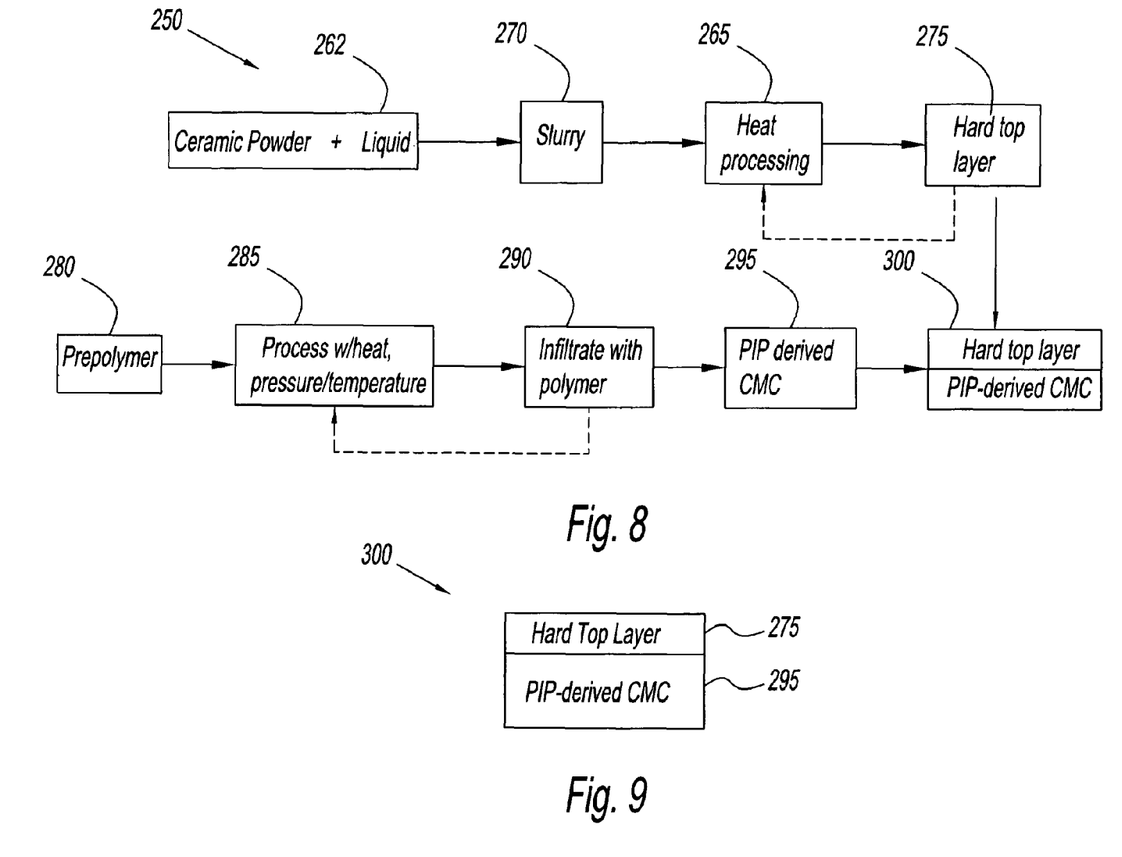
FIG. 8 is a flow chart illustrating an exemplary embodiment of a method of making a further refractory ceramic of FIG. 5.
FIG. 9 illustrates a schematic representation of a ceramic matrix composite with a hard outer layer of FIG. 8

Referring to FIGS. 8 and 9, the method of forming an alternate ceramic matrix composite structure 300, generally referred to by reference numeral 250, is shown. Ceramic matrix composite 300 is formed having a hard top or outer layer 275 and a much softer preceramic polymer-derived lower or internal composite layer 295. Ceramic matrix composite 300 is produced in a similar fashion as the graded ceramic of FIGS. 6. and 7 except that it does not contain intermediate layer 210. A slurry 270 is formed and is heated during a processing step such as a heating step 265 to form hard top or outer layer 275. Slurry 270 is heated to temperatures ranging from approximately 250° C. to approximately 2000° C., depending on the type of ceramic selected and the composition of the slurry components, as well as the structure and composition of the desired matrix phase(s). Hard outer layer 275 is optionally reheated in step 265 and further hardened to the desired hardness to form the harder layer of the composite 300. Hard outer layer 275 may be heated to a greater degree (higher temperatures/longer exposure) than layer 295 to ensure additional hardness. Residual porosity in a hard outer layer 275 can be reduced by filling this porosity with desired phase(s) using a variety of methods. Specifically, voids and void volume can be reduced by deposition of ceramic phase from the vapor (physical or chemical vapor deposition), from electrophoretic or electrostatic deposition from an additional ceramic slurry, by infiltration with ceramic-filled polymer pastes, and combinations of these or similar methods.

Softer layer 295 is formed from a prepolymer, preceramic polymer or blend 280 that is processed with desired heat, pressure, atmosphere conditions in step 285 and infiltrated during step 290. Steps 285 and 290 are repeated until the desired hardness and/or phase(s) of pyrolytic derived composite matrix composite 295 is achieved. Layers 275 and 295 are bonded to form the composite consisting of a hard ceramic top layer and the polymer infiltrated pyrolytic and composite matrix composite. Individual layers can be bonded together through chemical or mechanical means or a combination of bonding methods. For example, a thin adhesive can be used to bond the hard top coat to the underlying polymer-derived composite structure. In practice, it is preferred if the layers are strongly bonded together. One means to bond the layers together is to fix the topmost layer to the composite structure and to inject a glass, glass/ceramic or ceramic forming polymer into voids intentionally left in the structures. In this manner, glass/ceramic would fill at least a portion of the voids, and further processing could be used to crystallize the ceramic phase. Also in this manner, the injected preceramic polymer would fill at least a portion of the voids, and further processing could be used to convert the polymer into additional ceramic phase(s). Thus, the layers would be mechanically joined and integrated. Similarly, following fixturing of the layers adjacent one another, a vapor deposited phase could be introduced into the residual porosity, thereby creating a bonding mechanism. In addition, a molten metal or glass phase could be introduced into residual porosity in a layered structured, followed by cooling to solidify the molten phase in place. In one embodiment for a layered composite consisting of a hard face and a polymer derived composite, a molten glass could be forced into the residual porosity of both layers, and the structure then cooled to solidify the glass phase and rigidly join the layers in an integrated fashion. Glass compositions would be chosen to minimize reaction with the existing composite phases. Some glass compositions could be further processed to create ceramic/glass mixed phases.

The filler and matrix materials and structures described above are excellent for forming ballistic protection, e.g., for articles, supports and vehicles, including aircraft vehicles, and particularly for helicopters in the form of ceramic-containing armor shells. The ceramic armor shells can be formed in any three-dimensional shape of the surface of the helicopter. Of course, it is most desirable to produce the armor shells with minimal thickness to maintain reduced weight while still providing for a sufficiently hard surface for ballistic protection.

Figure 10:
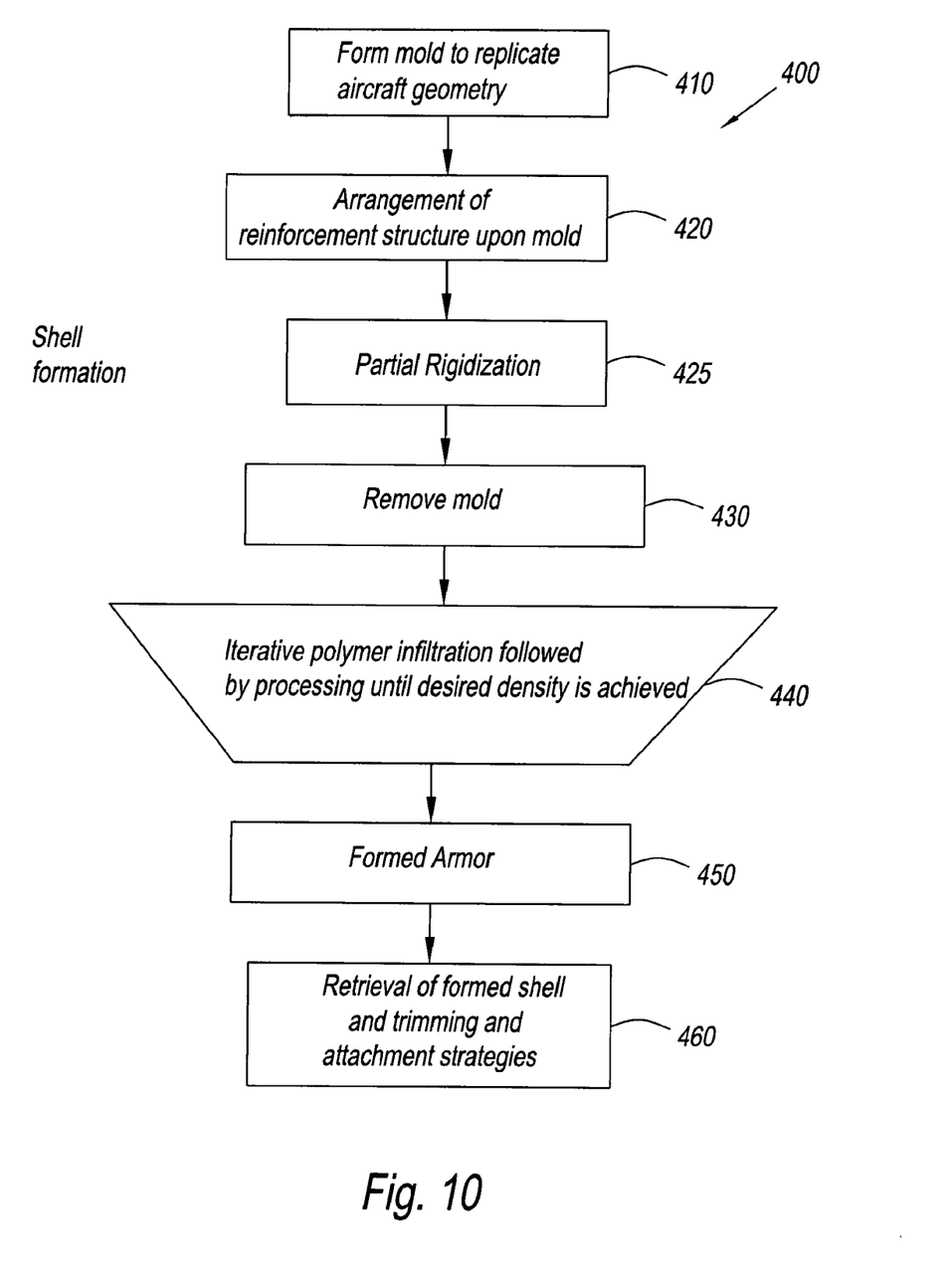
FIG. 10 illustrates a schematic diagram describing the forming of refractory ceramics into the armor shell for an aircraft, according to the present invention.

In operation, the molding process suitable for creating the disclosed ceramic armor shells will be described with respect to the polymer infiltration and pyrolysis and ceramic matrix composite (PIP-CMC) material as shown in FIG. 10, and generally referred to using reference numeral 400. In a first step 410 a mold is formed to replicate the outer geometry of the helicopter components targeted for protection. The fibrous structures 5 or particulate based structures 4 to be infiltrated are positioned within, around, upon or against mold or temporary tooling in step 420 during shell formation. Following partial rigidization in step 425, the mold or temporary tooling is removed in step 430 leaving the reinforced structure in the desired shape with remaining porosity. Iterative impregnation and/or heating (or alternate processing) steps 440 are effected until the desired density, phase composition(s), mechanical properties and residual porosity are achieved. The armor 450 is removed and trimmed as desired in step 460. Molds and temporary tooling can be fabricated using any known methods including machined metal or plastics, rapid prototyping (metal, ceramic, polymer and combinations thereof), waxes, and the like. Similar processing can be used to fabricate the other architectures. For example, separate structures for multiple layered composites (e.g. harder and softer layers) can be fabricated independently and subsequently joined using the methods described above.

Further, placement of the variably shaped armor components 450 can be placed as desired over the helicopter structure. The most vulnerable regions of the helicopter can be protected with armor having the most resistant architecture. Further, parts of the helicopter such as the blades can also be protected against ballistic firing. Protective armor shell articles can be attached to the aircraft structure in a variety of ways known in the art, including adhesives, bonding, mechanical fixturing, inserts, etc. Separate armor components can be positioned adjacent, overlapping or both relative to other armor components, and can be configured to have alignment or interlocking features to aid positioning and increase ballistic protection.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A method of making a shell of refractory ceramic armor, said ceramic armor shell capable of conforming to a three dimensional surface geometry; said method comprising:
    forming a mold to replicate the three dimensional surface geometry;
    arranging a ceramic core on said mold;
    removing said mold to leave said ceramic core;
    infiltrating a first portion of the ceramic core with a polymer; and
    processing said ceramic core wherein said ceramic core is in the shape of the three dimensional surface geometry, wherein the ceramic core further comprises at least a first layer, a second layer, and a third layer, said ceramic core being graded wherein the second layer has a hardness less than the first layer and the third layer has a hardness less than the second layer.

2. The method of claim 1, wherein the three dimensional surface geometry is the surface geometry of at least a portion of an aircraft.

3. A method of making a shell of refractory ceramic armor, said ceramic armor shell capable of conforming to a three dimensional surface geometry; said method comprising:
    forming a mold to replicate the three dimensional surface geometry;
    arranging a ceramic core on said mold;
    removing said mold to leave said ceramic core, and processing said ceramic core wherein said ceramic core is in the shape of the three dimensional surface geometry, wherein a first portion of said ceramic core is made from a slurry and a second portion of said ceramic core is made from a preceramic polymer based blend.

4. The method of making a shell of refractory ceramic armor according to claim 3, further comprising repeatedly heat processing said first portion to form a layer of uniform hardness.

5. The method of making a shell of refractory ceramic armor according to claim 3, further comprising repeatedly heating said first portion to form multiple layers of variable hardness.

6. The method of making a shell of refractory ceramic armor according to claim 3, further comprising polymer infiltrating and heat treating said second portion.

7. The method of making a shell of refractory ceramic armor according to claim 3, wherein said first portion and said second portion are bonded together.

8. The method of making shell of refractory ceramic armor according to claim 1, wherein said ceramic armor is trimmed and attached to a location on an aircraft.

9. The method of making a shell of refractory ceramic armor according to claim 8, wherein said aircraft is a helicopter.

10. The method of making a shell of refractory ceramic armor according to claim 1, wherein said component is a leading edge of an airfoil.

11. The method of making a shell of refractory ceramic armor according to claim 1, wherein said component is a helicopter blade.

12. The method of making a shell of refractory ceramic armor according to claim 1, wherein said first layer includes a fibrous core.

13. The method of making a shell of refractory ceramic armor according to claim 12, wherein fibers of the fibrous core are selected from a group consisting of carbon pitch fibers, polyacrylonitrile resin fibers, chopped carbon fibers, carbon nanotubes, activated carbon fibers, boron, boron carbide, oxycarbides, oxynitrides, aluminum oxide, aluminum oxynitride, aluminum nitride, and molybdenum fibers and combinations thereof.

14. A method of making a shell of refractory ceramic armor, said ceramic armor shell capable of conforming to a three dimensional surface geometry; said method comprising:

forming a mold to replicate the three dimensional surface geometry;

arranging a ceramic core on said mold;

removing said mold to leave said ceramic core, and processing said ceramic core wherein said ceramic core is in the shape of the three dimensional surface geometry wherein the ceramic core further comprises at least a first layer, a second layer, and a third layer, said ceramic core being graded wherein the second layer has a hardness less than the first layer and the third layer has a hardness less than the second layer, wherein said first layer comprises a fibrous core and a matrix in which the fibrous core is disposed, wherein the matrix includes at least one of a glass material, a glass/ceramic material, or a polymer derived ceramic material.

15. The method of making a shell of refractory ceramic armor according to claim 1, wherein the step of processing comprises heating at least a portion of the ceramic core between approximately 250° C. and 1150° C.

16. The method of making a shell of refractory ceramic armor according to claim 1, wherein the step of processing comprises heating at least a portion of the ceramic core between approximately 1150° C. and 2000° C.

17. The method of making a shell of refractory ceramic armor according to claim 1, wherein the polymer is at least one of carbides, oxycarbides, nitrides, carbonitrides, oxides, oxynitrides, borides or borocarbonitrides, phenolic precursors to glassy carbon, particulate carbon powder, and any combinations thereof.

18. The method of making a shell of refractory ceramic armor according to claim 1, wherein the step of processing comprises heat treating by applying radiation.

19. The method of making a shell of refractory ceramic armor according to claim 1, wherein the step of infiltrating comprises immersing the first portion in a liquid polymer.

20. The method of making a shell of refractory ceramic armor according to claim 1, further comprising the steps of cooling the ceramic core; and subsequent to cooling, repeating the step of infiltrating the first portion of the ceramic core.

21. The method of making a shell of refractory ceramic armor according to claim 1, further comprising a step of heat treating the first portion of the ceramic core after infiltrating the first portion.

* * * * *